(12) United States Patent
Nakamura

(10) Patent No.: US 8,095,020 B2
(45) Date of Patent: Jan. 10, 2012

(54) OPTICAL RECEIVING DEVICE AND OPTICAL TRANSMISSION SYSTEM

(75) Inventor: Kentaro Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 755 days.

(21) Appl. No.: 12/248,894

(22) Filed: Oct. 10, 2008

(65) Prior Publication Data
US 2009/0097866 A1    Apr. 16, 2009

(30) Foreign Application Priority Data
Oct. 12, 2007  (JP) ................. 2007-266306

(51) Int. Cl.
H04B 10/06 (2006.01)
H04B 17/00 (2006.01)
H04B 10/12 (2006.01)
H04B 10/00 (2006.01)

(52) U.S. Cl. .......... 398/208; 398/25; 398/147; 398/148; 398/159

(58) Field of Classification Search .......... 398/147, 398/148, 159
See application file for complete search history.

(56) References Cited

U.S. PATENT DOCUMENTS

| | | | | |
|---|---|---|---|---|
| 7,359,645 B2* | 4/2008 | Miyashita et al. | | 398/147 |
| 7,433,599 B2* | 10/2008 | Takahara et al. | | 398/81 |
| 2004/0179849 A1* | 9/2004 | Miyazaki | | 398/147 |
| 2004/0184814 A1* | 9/2004 | Ooi et al. | | 398/147 |
| 2005/0213987 A1* | 9/2005 | Nakamura et al. | | 398/147 |
| 2005/0226629 A1* | 10/2005 | Ooi et al. | | 398/147 |
| 2005/0265725 A1* | 12/2005 | Okano et al. | | 398/147 |

FOREIGN PATENT DOCUMENTS
JP   2003-101478 A   4/2003

* cited by examiner

Primary Examiner — Kenneth N Vanderpuye
Assistant Examiner — Abbas H Alagheband
(74) Attorney, Agent, or Firm — Fujitsu Patent Center

(57) ABSTRACT

According to an aspect of an embodiment, an apparatus includes: a wavelength-to-transmission quality characteristic obtaining unit for obtaining a wavelength-to-transmission quality characteristic; a residual dispersion-to-transmission quality characteristic saving unit for saving a residual dispersion-to-transmission quality characteristic; a wavelength-to-residual dispersion characteristic generating unit for generating a wavelength-to-residual dispersion characteristic from a relationship between the wavelengths of the other channels and the residual dispersion based on the wavelength-to-transmission quality characteristic and the residual dispersion-to-transmission quality characteristic; a variable dispersion compensator for providing variable dispersion compensation to another channel,; and a variable dispersion compensation controlling unit for performing setting control on a dispersion compensation amount.

8 Claims, 11 Drawing Sheets

OPTICAL RECEIVING DEVICE AND OPTICAL TRANSMISSION SYSTEM

CROSS-REFERENCE TO RELATED APPLICATIONS

This application is based upon and claims the benefit of priority from the prior Japanese Patent Application No. 2007-266306, filed on Oct. 12, 2007, the entire contents of which are incorporated herein by reference.

BACKGROUND

1. Field

The present application relates to an optical receiving device and an optical transmission system, for example.

2. Description of the Related Art

Recently, as the growth of broadband services has boosted a demand for communications, the demand for increasing the capacity of a backbone transmission system of an optical communication network has been rising. Under such circumstances, a WDM transmission system of 40 Gb/s has been gradually commercialized.

There are two ways to put a WDM transmission system of 40 Gb/s into use: replacing all low speed channels of 10 Gb/s or the like by high speed channels of 40 Gb/s; and replacing some low speed channels of an existing network by high speed channels in stages to make upgrades as required. The latter way is considered practical as doing so can introduce 40 Gb/s signals at low cost.

The transmission rate of an optical fiber varies according to a wavelength of a light. As a light travels over a longer transmission distance, the light undergoes more chromatic dispersion, which makes the pulse waveform of the light less distinguishable. The chromatic dispersion, which uses the units ps/nm/km, is defined as a difference between propagation times for two monochromatic lights whose wavelengths differ by 1 nm propagated over 1 km.

When pulse broadening due to chromatic dispersion occurs in a WDM system, which is for implementing a large capacity optical transmission for a long distance, it damages the system, significantly degrading the receiving capability. This is why dispersion compensation is provided to make chromatic dispersion occurring in an optical fiber equally zero (cancel).

Control for compensating chromatic dispersion by periodically cancelling chromatic dispersion occurring on a transmission line with dispersion compensation fibers and the like installed in optical repeaters which are arranged on the transmission line is widely adopted as a chromatic dispersion compensation control method.

As a WDM transmission system, however, usually manages the dispersion compensation of a central wavelength of multiplexed wavelengths so as to make a dispersion amount zero, it cannot compensate for the dispersion of signals whose wavelengths are other than the central wavelength, leaving the dispersion accumulated at a receiver side. Accumulated chromatic dispersion which has not been compensated by dispersion compensation fibers installed on a transmission channel is called residual dispersion. A tolerance for the residual dispersion is called dispersion tolerance.

Specifically, the dispersion tolerance is a tolerance for waveform distortion derived from chromatic dispersion (a tolerance for a bit error rate). If a chromatic dispersion amount deviates from the dispersion tolerance, the receiving side cannot guarantee its ability to distinguish between the signals "0" and "1" (eye-opening degradation becomes too severe to distinguish data).

FIG. 11 and FIG. 12 illustrate dispersion tolerance characteristics. FIG. 11 illustrates a dispersion tolerance curve of 10 Gb/s. FIG. 12 illustrates a dispersion tolerance curve of 40 Gb/s. The vertical axes indicate Q penalties (dB) and the horizontal axes indicate residual dispersion (ps/nm).

A Q value is an index used for quality evaluation of optical transmission. The Q value is a value that quantifies influence on a noise in the amplitude direction. A larger Q value indicates that the transmission quality is better. The Q penalty is a value that is obtained by subtracting an actually measured Q value from an ideal Q value. A smaller Q penalty value indicates that the transmission quality is better.

Referring to FIG. 11 and FIG. 12, the Q penalty for residual dispersion rd in the case of 10 Gb/s is 1.8, whereas that in the case of 40 Gb/s is 4, for example, which means that even with the same residual dispersion amount, the transmission quality in the case of 40 Gb/s becomes significantly worse. Namely, it proves that the dispersion tolerance of 40 Gb/s is much narrower than that of 10 Gb/s.

In a low speed WDM transmission of 10 Gb/s or the like, as the dispersion tolerance, which is a tolerance for residual dispersion, is broad, the residual dispersion at an optical receiver side can be suppressed to within the tolerance with a dispersion compensation fiber, having a suitable dispersion compensation amount, installed in each relay section on the transmission line.

In contrast, in a high speed WDM transmission of 40 Gb/s, as the dispersion tolerance is significantly narrower than that of 10 Gb/s (the strength of a high speed channel of 40 Gb/s is weaker against the chromatic dispersion than a low speed channel of 10 Gb/s is), the dispersion compensation fibers arranged on the transmission line are not enough for suppressing the residual dispersion to within a desired dispersion tolerance.

Accordingly, in the case of an optical transmission over a high speed channel of 40 Gb/s or the like, the residual dispersion is compensated not only by the dispersion compensation fibers installed on a transmission line but also by a variable chromatic dispersion compensator arranged in an optical receiver.

As a conventional dispersion compensation technique, a technique for making coarse adjustment to a dispersion compensation amount by selecting a predetermined dispersion compensation fiber from a unit, which has a plurality of dispersion compensation fibers of different dispersion compensation amounts, and then making fine adjustment to the dispersion compensation amount of the signal light after the coarse adjustment with a light reflection element unit which produces group delay by changing an optical path length (for example, see Patent Document 1) is proposed. Patent Document 1: Japanese Patent Application Laid-Open Publication No. 2003-101478 (paragraphs 0013 to 0024, FIG. 1)

SUMMARY

According to an aspect of an embodiment, an apparatus includes: An optical receiving device, comprising:

a wavelength-to-transmission quality characteristic obtaining unit obtaining a wavelength-to-transmission quality characteristic;

a residual dispersion-to-transmission quality characteristic saving unit saving a residual dispersion-to-transmission quality characteristic;

a wavelength-to-residual dispersion characteristic generating unit generating a wavelength-to-residual dispersion characteristic from a relationship between the wavelengths of said other channels and said residual dispersion based on said wavelength-to-transmission quality characteristic and said residual dispersion-to-transmission quality characteristic;

a variable dispersion compensator for providing variable dispersion compensation to another channel, wherein said variable dispersion compensator is installed in a receiving end of the another channel to be changed when said one of other channels is changed to said another channel; and a variable dispersion compensation controlling unit for performing setting control on a dispersion compensation amount to be set in said variable dispersion compensator.

DETAILED DESCRIPTION OF THE PREFERRED EMBODIMENTS

In order to install a high speed channel of 40 Gb/s or the like, a variable dispersion compensator is installed in a receiving end of the channel and a dispersion compensation amount of the variable dispersion compensator is optimally set.

In the above-described case, adjustment is made by monitoring a transmission quality such as a Q penalty. If a residual dispersion amount at the receiving end is so large that it exceeds a dispersion tolerance, a signal is not conveyed, which makes the monitoring of a transmission quality impossible. For that reason, when a signal is not conveyed, a dispersion compensation amount to allow the signal to be conveyed needs to be found at first.

Figure 12:
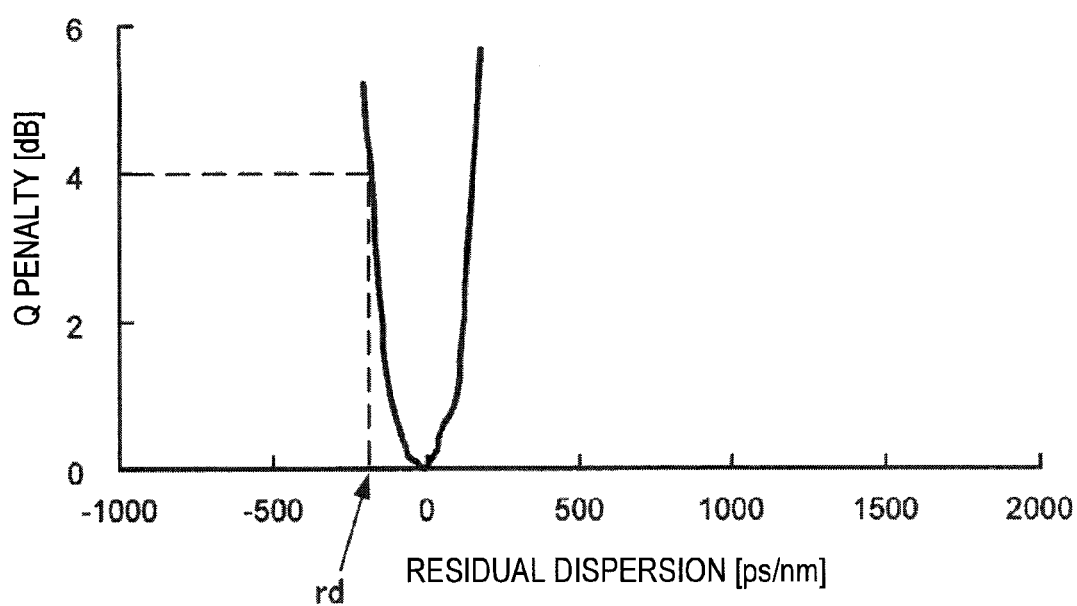
FIG. 12 illustrates a dispersion tolerance characteristic.

The situation in which a signal is not conveyed is such that it is impossible to distinguish between pieces of information of "0" and "1" from a received signal by any means. For example, in FIG. 12, when the residual dispersion of a received signal is rd, information can be received to some extent in spite of such a large Q penalty that makes the transmission quality so bad. Assuming that the residual dispersion is +500 ps/nm, however, no corresponding Q penalty exists, thus, no Q penalty can be measured (the situation in which no Q penalty can be measured is such that the pieces of information "0" and "1" cannot be distinguished from each other by any means). That means that when the residual dispersion is +500 ps/nm, a situation in which a signal is not conveyed occurs. Namely, on the graph illustrating a dispersion tolerance characteristic, a signal having a residual dispersion that does not contact the dispersion tolerance curve deviates completely from the dispersion tolerance, which means the signal is not conveyed.

If an intensity modulation system such as a NRZ (Non-Return to Zero) is employed as a modulation system for an optical transmission, a dispersion compensation amount can be found by changing a dispersion compensation amount of the variable dispersion compensator and observing whether a signal is conveyed or not.

In contrast, if a phase modulation system such as a DPSK (Differential Phase Shift Keying), a DQPSK (Differential Quadrature Phase Shift Keying) or the like is employed as a modulation system, since an optical receiver is provided with a delay interferometer that restores intensity modulation information of the signal from phase modulation information, phase adjustment control of the delay interferometer needs to be completed to check whether a signal is conveyed or not.

Such an optical receiver searches for a dispersion compensation amount by making the adjustments to the dispersion compensation amount of the variable dispersion compensator and the phase adjustment control to the delay interferometer in conjunction with each other. That causes a problem in that the optical receiver takes a significantly longer time in checking whether a signal is conveyed or not compared to an intensity modulation system such as an NRZ.

Figure 13:
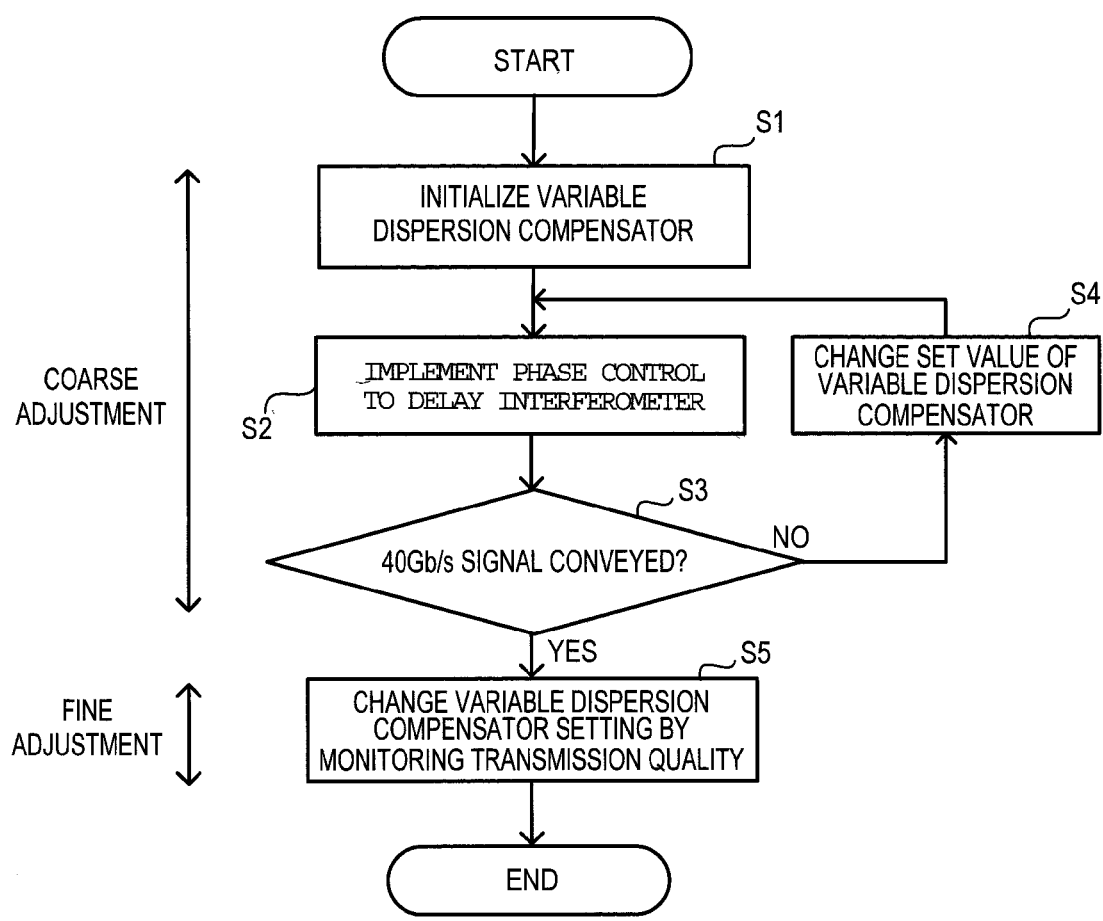
FIG. 13 illustrates an adjustment flow according to a conventional dispersion compensation amount setting.

FIG. 13 illustrates an adjustment flow according to a conventional dispersion compensation amount setting. The figure illustrates a conventional dispersion compensation amount adjustment flow that is performed by an operator on a variable dispersion compensator that is installed in an optical receiver that receives and demodulates an optical signal that is phase modulated and transmitted.

S1: Initialize a dispersion compensation amount of a variable dispersion compensator.

S2: Implement phase adjustment control of a delay interferometer.

S3: Judge whether a 40 Gb/s signal is conveyed or not. If the signal is not conveyed, the flow proceeds to step S4. If the signal is conveyed, the flow jumps to step S5.

S4: Change a dispersion set amount of the variable dispersion compensator, and return to step S2.

S5: Decide an optimal dispersion compensation amount by monitoring the transmission quality and making adjustment to the variable dispersion compensator.

The adjustment operation from step S1 to step S4 that is conducted before a dispersion compensation amount to convey the signal is roughly obtained, i.e., the residual dispersion is suppressed to within the dispersion tolerance, corresponds to the coarse adjustment. The adjustment operation at step S5 that is conducted after the signal is conveyed (after the residual dispersion is suppressed to within the dispersion tolerance) and before an optimal dispersion compensation amount which makes the transmission quality better (for example, makes the Q penalty zero) is obtained corresponds to the fine adjustment.

As such, during the coarse adjustment to search for a dispersion compensation amount to convey a signal, operations such as providing a dispersion compensation amount of a variable dispersion compensator variable→making phase adjustment control to a delay interferometer→confirming that a signal is conveyed→providing the dispersion compensation amount of the variable dispersion compensator variable→making the phase adjustment control to the delay interferometer→ . . . are repeated. These operations take much time and energy, and take a significantly long time to finish the setting of the dispersion compensation amount of the variable dispersion compensator. As a result, start-up cannot be performed quickly and operability and convenience are reduced.

Figure 1:
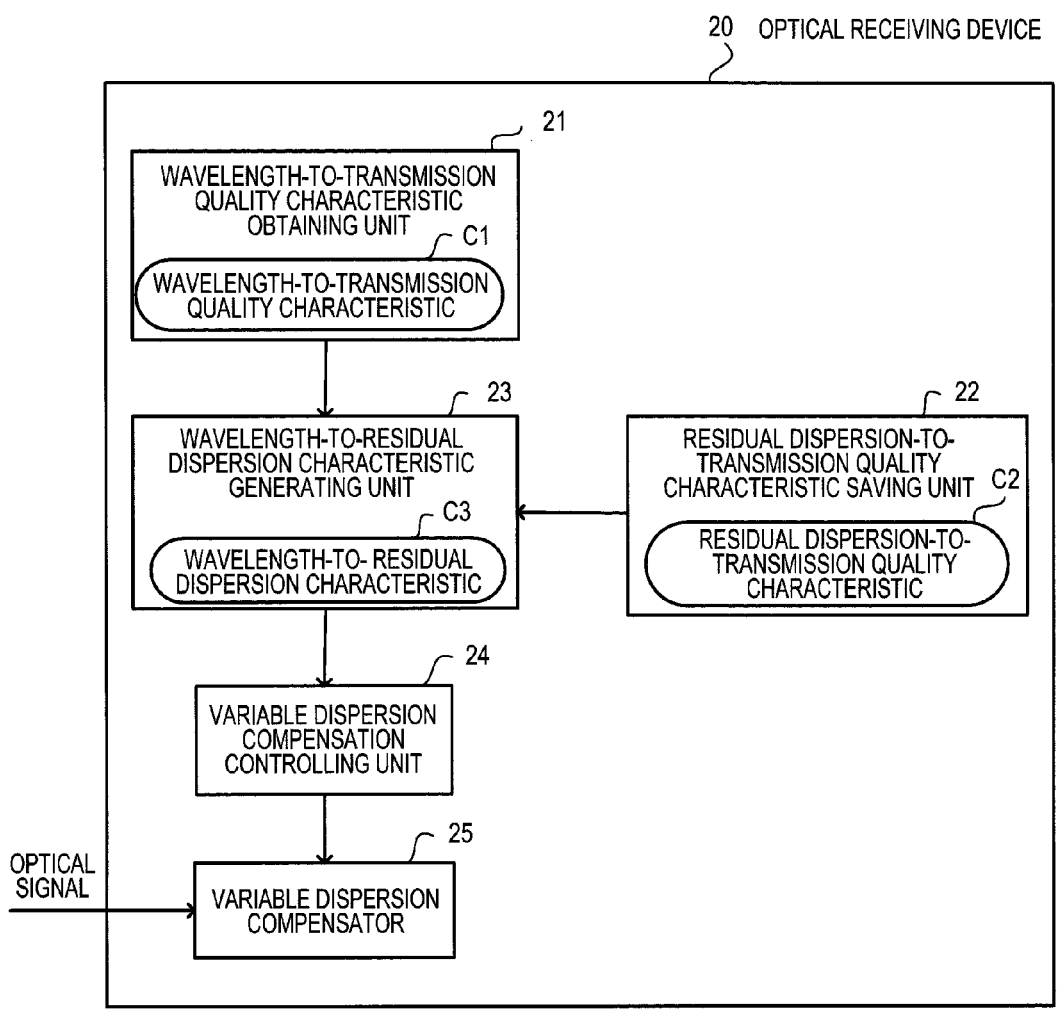
FIG. 1 illustrates an outline of an optical receiving device.

Embodiments will be described below with reference to the drawings. FIG. 1 illustrates an outline of an optical receiving device. An optical receiving device 20 of a first embodiment is a device for making an optical receiving process by providing dispersion compensation on a WDM signal. The optical receiving device 20 is composed of a wavelength-to-transmission quality characteristic obtaining unit 21, a residual dispersion-to-transmission quality characteristic saving unit 22, a wavelength-to-residual dispersion characteristic generating unit 23, a variable dispersion compensation controlling unit 24, and a variable dispersion compensator 25.

The wavelength-to-transmission quality characteristic obtaining unit 21 obtains a wavelength-to-transmission quality characteristic C1 that represents a relationship between wavelengths of low speed channels and transmission qualities that are actually measured for the respective wavelengths of the low speed channels by measuring the transmission qualities of the low speed channels (low speed optical signals) which compose a received wavelength multiplexed signal (WDM signal).

The residual dispersion-to-transmission quality characteristic saving unit 22 registers and saves a residual dispersion-to-transmission quality characteristic C2 that represents a relationship between the residual dispersion and the transmission qualities so that it can anticipate the transmission quality amount of the optical signal from the residual dispersion in the case where the received optical signal has residual dispersion.

The wavelength-to-residual dispersion characteristic generating unit 23 estimates a relationship between the wavelengths and the residual dispersion of low speed channels based on the wavelength-to-transmission quality characteristic C1 and the residual dispersion-to-transmission quality characteristic C2 without actually measuring the residual dispersion of the low speed channels, and generates a wavelength-to-residual dispersion characteristic C3 from the estimation results.

In the case where a given low speed channel among wavelength multiplexed low speed channels is changed to a high speed channel (high speed optical signal), the variable dispersion compensator 25 is installed in a receiving end of the channel that is changed. The variable dispersion compensator 25 receives the high speed channel, which is transmitted after the channel change, and makes variable dispersion compensation to the received high speed channel. The variable dispersion compensation controlling unit 24 performs setting control on the dispersion compensation amount to be set to the variable dispersion compensator 25. The variable dispersion compensator may be a VIPA type variable dispersion compensator, a variable electronic dispersion compensator (EDC: Electronic Dispersion Compensation), a fiber grating variable dispersion compensator, or the like.

Assuming that, in the case where all channels are operated by low speed channels, some of the low speed channels are changed to high speed channels so as to newly introduce the high speed channels. In such a case, when the high speed channel is introduced, the variable dispersion compensation controlling unit 24 obtains a residual dispersion amount corresponding to a wavelength that is changed to a high speed channel from the wavelength-to-residual dispersion characteristic C3, and transmits the obtained residual dispersion amount of its reverse sign to the variable dispersion compensator 25.

The variable dispersion compensator 25, in which the amount that is transmitted from the variable dispersion compensation controlling unit 24 is set, provides the dispersion compensation to suppress the residual dispersion amount of the high speed channel to within the dispersion tolerance.

Now, the dispersion compensation in a WDM system, which includes the optical receiving device 20, will be described. Here, it is assumed that the low speed channels are 10 Gb/s and the high speed channel is 40 Gb/s.

Figure 2:
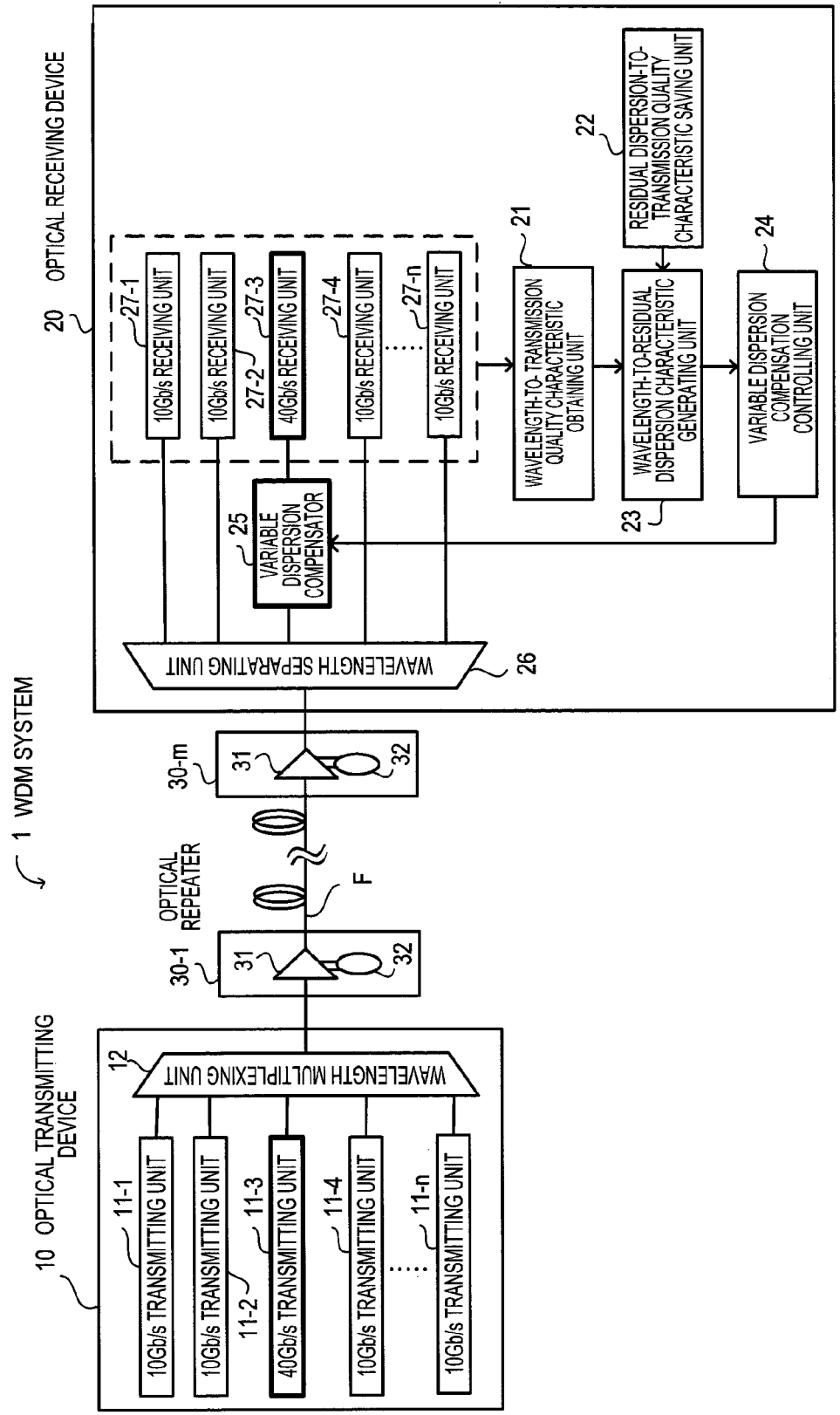
FIG. 2 illustrates a configuration of a WDM system.

FIG. 2 illustrates a configuration of a WDM system. A WDM system 1 is composed of an optical transmitting device 10, an optical receiving device 20, and optical repeaters 30-1 to 30-m. The optical transmitting device 10 and the optical receiving device 20 are connected to each other by an optical fiber transmission line F. The optical repeaters 30-1 to 30-m are arranged on the optical fiber transmission line F.

The figure illustrates a case where a 40 Gb/s channel is introduced and replaces one 10 Gb/s channel. In this case, the third 10 Gb/s channel is changed to 40 Gb/s.

The optical transmitting device 10 is composed of 10 Gb/s transmitting units 11-1, 11-2, and 11-4 to 11-n, a 40 Gb/s transmitting unit 11-3, and a wavelength multiplexing unit 12. The 10 Gb/s transmitting units 11-1, 11-2, and 11-4 to 11-n, which have been used from the beginning of the operation, perform a transmission process on 10 Gb/s optical signals, whereas the newly introduced 40 Gb/s transmitting unit 11-3 performs a transmission process of 40 Gb/s optical signals.

Different wavelengths $\lambda 1$ to $\lambda n$ in the WDM transmission are assigned as follows: The 10 Gb/s transmitting units 11-1 and 11-2 output 10 Gb/s optical signals of $\lambda 1$ and $\lambda 2$, respectively. The 40 Gb/s transmitting unit 11-3 outputs a 40 Gb/s optical signal of $\lambda 3$. The 10 Gb/s transmitting units 11-4 to 11-n output 10 Gb/s optical signals of $\lambda 4$ to $\lambda n$. The wavelength multiplexing unit 12 generates WDM signals by wavelength multiplexing the optical signals of $\lambda 1$ to $\lambda n$, and outputs the WDM signals onto the optical fiber transmission line F.

Each of the optical repeaters 30-1 to 30-m is composed of an optical amplifier 31 and a dispersion compensation fiber 32. The optical amplifier 31 amplifies and outputs the received WDM signal. The dispersion compensation fiber 32 has a dispersion amount for compensating the chromatic dispersion occurring in a relay section of the optical fiber transmission line F and performs the dispersion compensation in each relay section.

If the WDM system 1 had been constructed as a system for performing WDM transmission only at 10 Gb/s at the beginning, the dispersion compensation fiber 32 in each optical repeater would have a dispersion amount for making the chromatic dispersion compensation to the central wavelength of a WDM signal, for which 10 Gb/s n wavelengths are multiplexed, before the introduction of a 40 Gb/s channel in the WDM system 1.

The optical receiving device 20 is composed of a wavelength-to-transmission quality characteristic obtaining unit 21, a residual dispersion-to-transmission quality characteristic saving unit 22, a wavelength-to-residual dispersion characteristic generating unit 23, a variable dispersion compensation controlling unit 24, a variable dispersion compensator 25, a wavelength separating unit 26, 10 Gb/s receiving units 27-1, 27-2, and 27-4 to 27-n, and 40 Gb/s receiving unit 27-3.

The wavelength separating unit 26 receives a transmitted WDM signal, separates the signal into each wavelength, and outputs n optical signals. The 10 Gb/s receiving units 27-1 and 27-2 perform a receiving process on $\lambda 1$ and $\lambda 2$ 10 Gb/s optical signals, respectively. The 10 Gb/s receiving units 27-4 to 27-n perform a receiving process on λ4 to λn 10 Gb/s optical signals, respectively.

The variable dispersion compensator 25 is arranged at a channel receiving end to which a high speed channel has been introduced. In the figure, the variable dispersion compensator 25 is arranged at the third channel output stage of the wavelength separating unit 26. The variable dispersion compensator 25 compensates for the residual dispersion of a 40 Gb/s optical signal based on a control signal that is output from the variable dispersion compensation controlling unit 24. The 40 Gb/s receiving unit 27-3 performs a receiving process on the 40 Gb/s optical signal of the wavelength λ3 which has been subjected to the dispersion compensation.

The wavelength-to-transmission quality characteristic obtaining unit 21 obtains a wavelength-to-transmission quality characteristic that represents a relationship between wavelengths λ1 to λn of respective 10 Gb/s channels and the transmission qualities that have been actually measured for the respective wavelengths, and measures the transmission qualities of 10 Gb/s optical signals which compose a WDM signal received before the introduction of 40 Gb/s. The residual dispersion-to-transmission quality characteristic saving unit 22 saves an anticipated residual dispersion-to-transmission quality characteristic that represents a general relationship between the residual dispersion and the transmission quality.

The wavelength-to-residual dispersion characteristic generating unit 23 estimates a relationship between the wavelengths λ1 to λn and the residual dispersion of 10 Gb/s optical signal channels based on the wavelength-to-transmission quality characteristic and the residual dispersion-to-transmission quality characteristic without measuring the residual dispersion of the 10 Gb/s optical signals, and generates a wavelength-to-residual dispersion characteristic.

The variable dispersion compensation controlling unit 24 obtains a residual dispersion amount corresponding to the wavelength λ3 of the channel that is changed to a 40 Gb/s optical signal from the wavelength-to-residual dispersion characteristic, and transmits the obtained residual dispersion amount of its reverse sign to the variable dispersion compensator 25 as a control signal.

The variable dispersion compensator 25 receives the control signal, sets the amount that is transmitted from the variable dispersion compensation controlling unit 24, and provides the dispersion compensation to suppress the residual dispersion amount of the 40 Gb/s optical signal of the wavelength λ3 at the third channel to within the dispersion tolerance.

Now, the wavelength-to-transmission quality characteristic, the residual dispersion-to-transmission quality characteristic, and the wavelength-to-residual dispersion characteristic will be described by taking WDM system 1 as an example. In the description, the Q penalty is used as the transmission quality.

Figure 3:
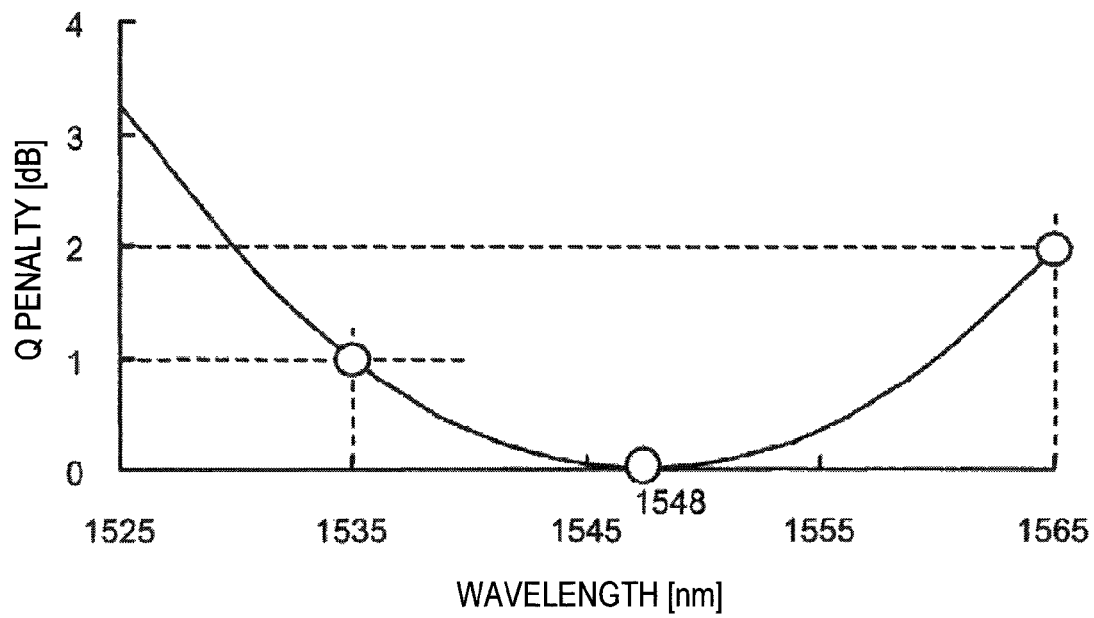
FIG. 3 illustrates a wavelength-to-transmission quality characteristic.

FIG. 3 illustrates a wavelength-to-transmission quality characteristic. The vertical axis indicates the Q penalty (dB) and the horizontal axis indicates the wavelength (nm). The wavelength-to-transmission quality characteristic obtaining unit 21 measures a Q penalty from each of the optical signals of the wavelengths λ1 to λn at 10 Gb/s beforehand when it receives WDM signals of the wavelengths λ1 to λn at 10 Gb/s which have been in operation before the introduction of the 40 Gb/s.

In the case illustrated in FIG. 3, the Q penalty of the 10 Gb/s optical signal channel with a wavelength 1525 nm is measured as 3.2 dB, the Q penalty of the 10 Gb/s optical signal channel with the wavelength 1535 nm is measured as 1 dB, the Q penalty of the 10 Gb/s optical signal channel with the wavelength 1548 nm is measured as 0 dB, and the Q penalty of the 10 Gb/s optical signal channel with the wavelength 1565 nm is measured as 2 dB. The wavelength-to-transmission quality characteristic obtaining unit 21 obtains and stores a wavelength-to-Q penalty characteristic that is a relationship between the wavelength and the actually measured Q penalty as illustrated in FIG. 3.

Figure 4:
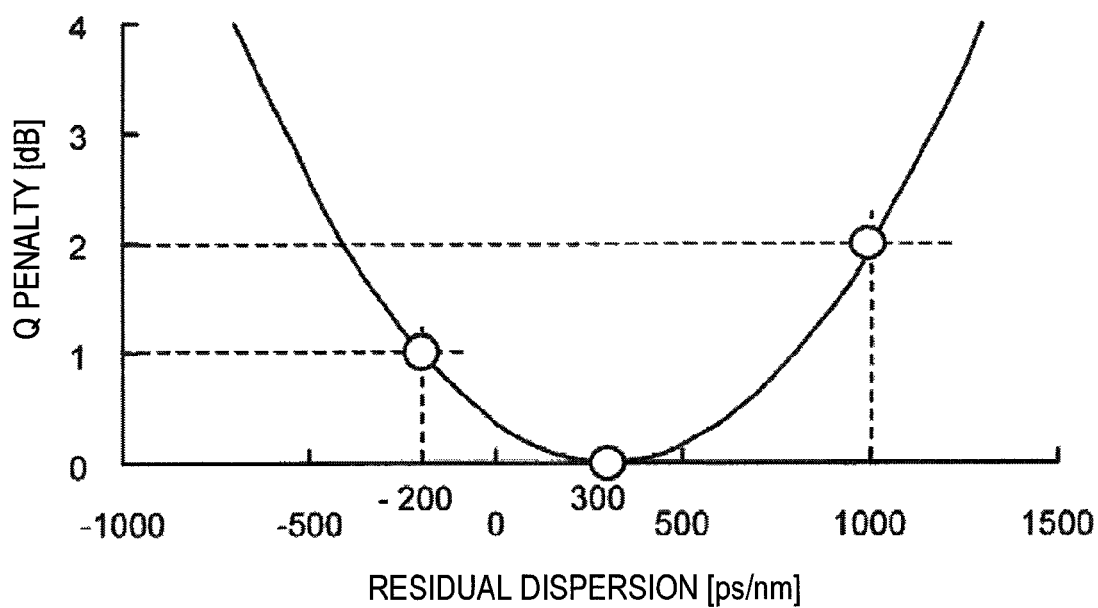
FIG. 4 illustrates a residual dispersion-to-transmission quality characteristic.

FIG. 4 illustrates a residual dispersion-to-transmission quality characteristic. The vertical axis indicates the Q penalty (dB) and the horizontal axis indicates the residual dispersion (ps/nm). A residual dispersion-to-Q penalty characteristic, which is saved in the residual dispersion-to-transmission quality characteristic saving unit 22, is previously distinguished data that represents a rough characteristic of any residual dispersion of a received optical signal for illustrating a relationship between the residual dispersion amount and the Q penalty of the corresponding optical signal.

In the case illustrated in FIG. 4, the Q penalty is 1 dB when the residual dispersion is −200 ps/nm, the Q penalty is 0 dB when the residual dispersion is 300 ps/nm, and the Q penalty is 2 dB when the residual dispersion is 1000 ps/nm. A graph illustrating a characteristic that can be obtained from the relationship is registered in the residual dispersion-to-transmission quality characteristic saving unit 22 in advance.

Figure 5:
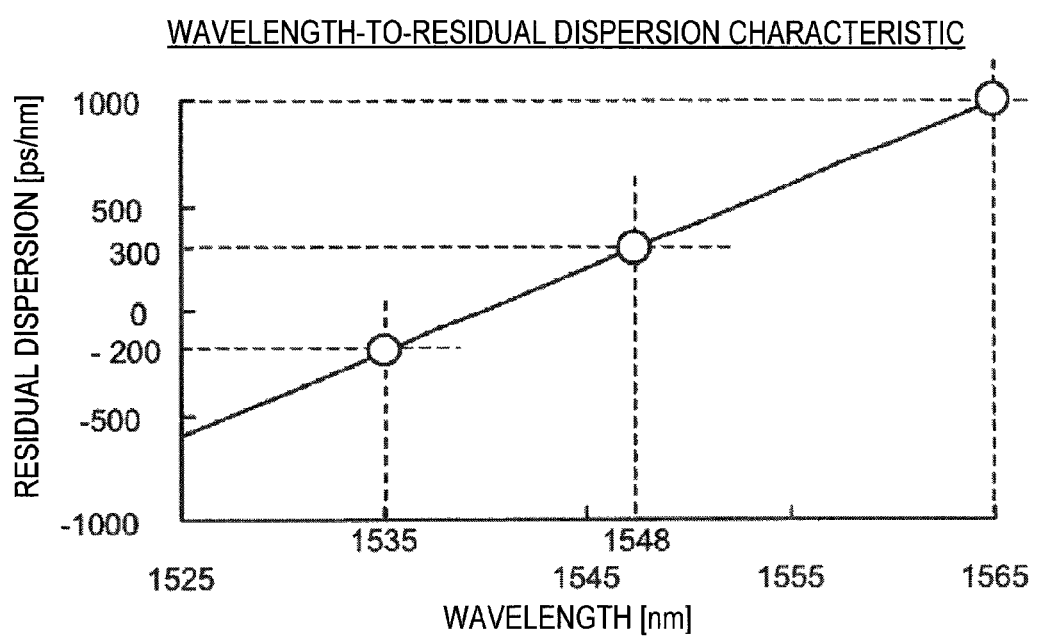
FIG. 5 illustrates a wavelength-to-residual dispersion characteristic.

FIG. 5 illustrates a wavelength-to-residual dispersion characteristic. The wavelength-to-residual dispersion characteristic generating unit 23 generates a wavelength-to-residual dispersion characteristic via a Q penalty from the wavelength-to-Q penalty characteristic illustrated in FIG. 3 and the residual dispersion-to-Q penalty characteristic illustrated in FIG. 4.

In the case of the Q penalty=0 dB, as the wavelength=1548 nm is detected from FIG. 3 and the residual dispersion=300 ps/nm is detected from FIG. 4, the relationship of (wavelength, residual dispersion)=(1548, 300) can be learned accordingly.

Similarly, in the case of the Q penalty=1 dB, as the wavelength=1535 nm is detected from FIG. 3 and the residual dispersion=−200 ps/nm is detected from FIG. 4, the relationship of (wavelength, residual dispersion)=(1535, −200) can be learned accordingly; and in the case of the Q penalty=2 dB, as the wavelength=1565 nm is detected from FIG. 3 and the residual dispersion=1000 ps/nm is detected from FIG. 4, the relationship of (wavelength, residual dispersion)=(1565, 1000) can be learned accordingly. FIG. 5 plots the relationships.

As such, the wavelength-to-residual dispersion characteristic generating unit 23 does not actually measure the residual dispersion of a 10 Gb/s optical signal. Rather, the wavelength-to-residual dispersion characteristic generating unit 23 estimates the relationship between the wavelengths λ1 to λn of the 10 Gb/s optical signals and the residual dispersion corresponding to the respective wavelengths λ1 to λn from the wavelength-to-Q penalty characteristic and the residual dispersion-to-Q penalty characteristic, and generates and stores a wavelength-to-residual dispersion characteristic as illustrated in FIG. 5 from the estimation result.

Now, variable dispersion compensation control will be described. Under the control illustrated in FIG. 3 to FIG. 5, the WDM system 1 has obtained each residual dispersion amount corresponding to the wavelengths λ1 to λn. As the wavelength λ3 is to be changed from 10 Gb/s to 40 Gb/s, the variable dispersion compensator 25 is installed at the receiving end of the third channel corresponding to the wavelength λ3.

If the wavelength λ3 for which a high speed channel has been installed is 1565 nm, for example, the variable dispersion compensation controlling unit 24 obtains a residual dispersion amount 1000 ps/nm corresponding to 1565 nm from the wavelength-to-residual dispersion characteristic illustrated in FIG. 5. Then, the variable dispersion compensation controlling unit 24 transmits a control signal that includes setting information of −1000 ps/nm, which is the residual dispersion amount 1000 ps/nm of a reverse sign of to the variable dispersion compensator 25, to cancel the 1000 ps/nm.

The variable dispersion compensator 25, in which the dispersion amount is set to −1000 ps/nm based on the control signal that is transmitted from the variable dispersion compensation controlling unit 24, provides the dispersion compensation to the received 40 Gb/s optical signal of the wavelength λ3.

Figure 6:
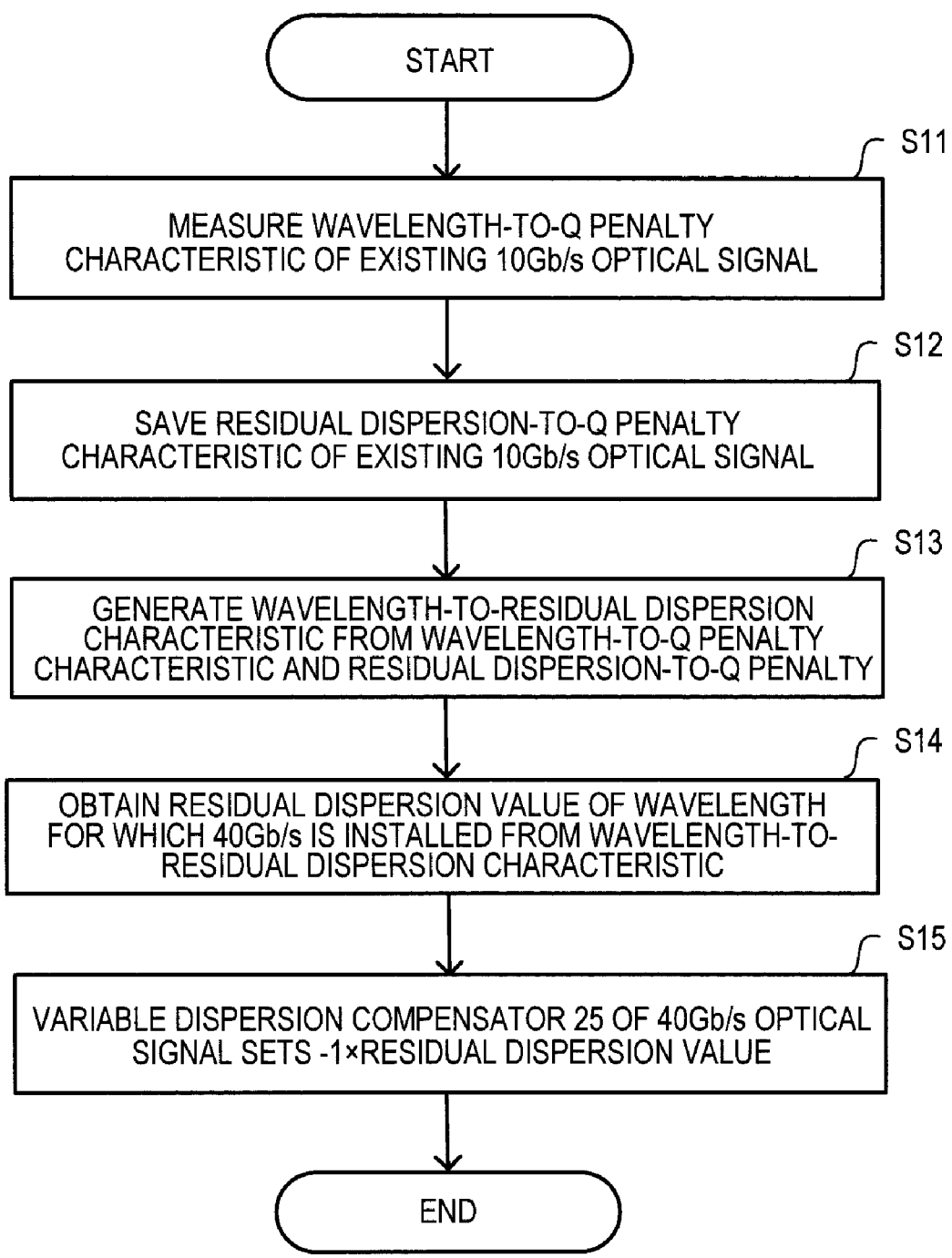
FIG. 6 illustrates a series of variable dispersion compensation operations.

FIG. 6 illustrates a series of variable dispersion compensation operations.

S11: The wavelength-to-transmission quality characteristic obtaining unit 21 measures a wavelength-to-Q penalty characteristic of existing 10 Gb/s optical signals beforehand.

S12: The residual dispersion-to-transmission quality characteristic saving unit 22 previously saves a residual dispersion-to-Q penalty characteristic of the existing 10 Gb/s optical signals.

S13: The wavelength-to-residual dispersion characteristic generating unit 23 generates a wavelength-to-residual dispersion characteristic based on the wavelength-to-Q penalty characteristic and the residual dispersion-to-Q penalty characteristic.

S14: The variable dispersion compensation controlling unit 24 obtains a residual dispersion amount of the wavelength for which 40 Gb/s has been introduced from the wavelength-to-residual dispersion characteristic.

S15: The variable dispersion compensator 25 sets −1×residual dispersion amount (the same residual dispersion amount with an opposite sign) of the residual dispersion amount obtained by the variable dispersion compensation controlling unit 24.

Assuming that, in the case where all channels are operated by 10 Gb/s, a part of the 10 Gb/s channels is to be changed to 40 Gb/s channel(s), in the case where 40 Gb/s channel(s) are to be newly introduced, 10 Gb/s channel(s) are changed to 40 Gb/s channel(s) with the above-described control. In this case, a dispersion amount required for conveying the 40 Gb/s optical signal (dispersion amount for suppressing the residual dispersion of the 40 Gb/s optical signal to within the dispersion tolerance) is automatically set in the variable dispersion compensator 25.

That saves the operator from the conventional operation of coarse adjustment which takes much time. The operator only needs to perform the fine adjustment for obtaining a dispersion compensation amount to optimize the transmission quality such as the Q penalty here. That enables speedy installation of a high speed channel, contributing to improvement of the operability and convenience.

A wavelength-to-residual dispersion characteristic is generated from a wavelength-to-transmission quality for 10 Gb/s and a residual dispersion-to-transmission quality for 10 Gb/s. From the wavelength-to-residual dispersion characteristic, the residual dispersion of 40 Gb/s is obtained. Here, a rough dispersion compensation amount enough to convey a 40 Gb/s optical signal may be obtained. Controlling the operation to compensate the residual dispersion amount obtained from the wavelength-to-transmission quality and the residual dispersion-to-transmission quality based on 10 Gb/s (residual dispersion amount of 40 Gb/s that is estimated from the characteristic of 10 Gb/s) is allowed.

The above-described residual dispersion-to-transmission quality characteristic illustrated in FIG. 4 depends on transmission conditions (a physical parameter for the optical fiber transmission line F, a power of the optical signal that flows through the optical fiber transmission line F, and the like) due to a nonlinear optical effect and the like. Although the relationship of the wavelength-to-residual dispersion characteristic illustrated in FIG. 5 also changes, an error within the dispersion tolerance of 40 Gb/s may be allowed if the 40 Gb/s optical signal can be conveyed.

Now, a second embodiment will be described. In the first embodiment, when the WDM transmission is operated first, all the channels are operated by low speed channels, and when a high speed channel is introduced thereafter, early establishment is achieved by automatically providing the dispersion compensation with the coarse adjustment made on the high speed channel.

In contrast, in the second embodiment, it is assumed that a plurality of high speed channels are introduced on the system when low speed channels are replaced by high speed channels. The embodiment is adapted to obtain a dispersion compensation amount of the new high speed channel from information on dispersion compensation amounts set in the already installed variable dispersion compensator.

Figure 7:
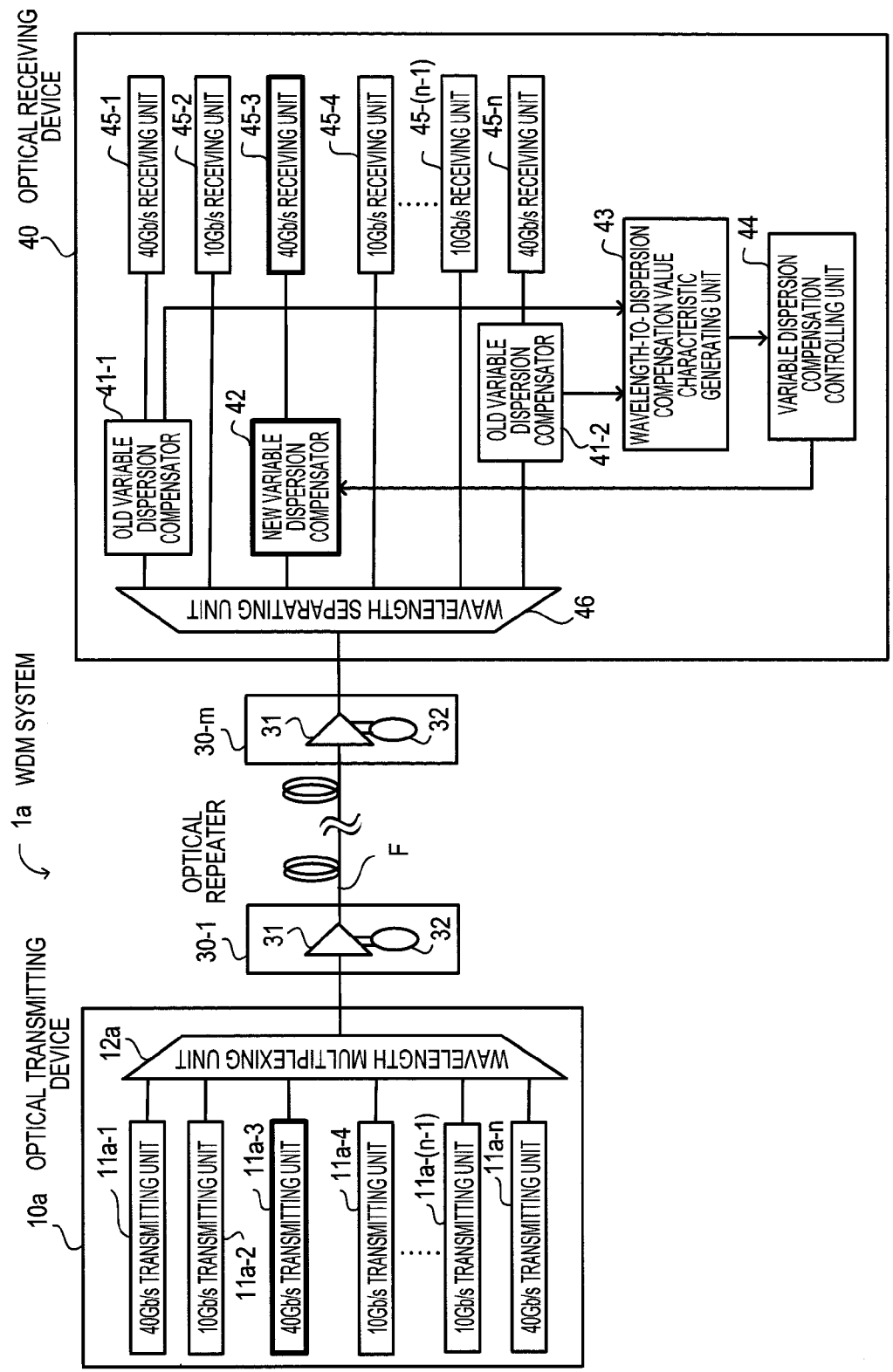
FIG. 7 illustrates a configuration of a WDM system.

FIG. 7 illustrates a configuration of a WDM system. A WDM system 1a is composed of an optical transmitting device 10a, an optical receiving device 40, and optical repeaters 30-1 to 30-m. The optical transmitting device 10a and the optical receiving device 40 are connected with each other by an optical fiber transmission line F. The optical repeaters 30-1 to 30-m are arranged on the optical fiber transmission line F.

FIG. 7 illustrates a WDM system where WDM transmission is conducted in a mixed state of channels where the first channel and the nth channel are 40 Gb/s channels and the other channels are 10 Gb/s channels, and the third 10 Gb/s channel has been newly changed to 40 Gb/s.

The optical transmitting device 10a is composed of a 40 Gb/s transmitting unit 11a-1, a 10 Gb/s transmitting unit 11a-2, a 40 Gb/s transmitting unit 11a-3, 10 Gb/s transmitting unit 11a-4 to 11a-(n-1), a 40 Gb/s transmitting unit 11a-n, and a wavelength multiplexing unit 12a.

The 10 Gb/s transmitting units 11a-2, and 11a-4 to 11a-(n-1) perform a transmission process on optical signals of 10 Gb/s, whereas the 40 Gb/s transmitting units 11a-1, 11a-3, and 11a-n perform a transmission process on optical signals of 40 Gb/s.

Different wavelengths λ1 to λn in the WDM transmission are assigned as follows: The 10 Gb/s transmitting units 11a-2, and 11a-4 to 11a-(n-1) output 10 Gb/s optical signals of λ2, λ4 to λ(n-1), respectively. The previously installed 40 Gb/s transmitting unit 11a-1 outputs a 40 Gb/s optical signal of λ1. The newly installed 40 Gb/s transmitting unit 11a-3 outputs a 40 Gb/s optical signal of λ3. The previously installed 40 Gb/s transmitting unit 11a-n outputs a 40 Gb/s optical signal of λn. The wavelength multiplexing unit 12a generates a WDM signal by wavelength multiplexing the optical signals of λ1 to λn, and outputs the WDM signal onto the optical fiber transmission line F.

As the optical repeaters 30-1 to 30-m have been described with reference to FIG. 2, an explanation is omitted. The optical receiving device 40 is composed of old variable dispersion compensators 41-1 and 41-2, a new variable dispersion compensator 42, a wavelength-to-dispersion compensation amount characteristic generating unit 43, a variable dispersion compensation controlling unit 44, a 40 Gb/s receiving unit 45-1, a 10 Gb/s receiving unit 45-2, a 40 Gb/s receiving unit 45-3, 10 Gb/s receiving units 45-4 to 45-(n-1), a 40 Gb/s receiving unit 45-n and a wavelength separating unit 46.

The wavelength separating unit 46 receives a transmitted WDM signal, separates the signal into each wavelength, and outputs the n optical signals. The 10 Gb/s receiving units 45-2 and 45-4 to 45-(n-1) perform a receiving process on $\lambda 2$ and $\lambda 4$ to $\lambda(n-1)$ 10 Gb/s optical signals, respectively.

The old variable dispersion compensators 41-1 and 41-2 are installed in receiving ends of already installed 40 Gb/s channels. The old variable dispersion compensator 41-1, which is a previously installed variable dispersion compensator for providing the variable dispersion compensation to a received 40 Gb/s channel, is installed in the output stage of the first channel of the wavelength separating unit 46 and provides the dispersion compensation to a 40 Gb/s optical signal of the wavelength $\lambda 1$. The old variable dispersion compensator 41-2 is installed at the output stage of the nth channel of the wavelength separating unit 46 and provides the dispersion compensation to a 40 Gb/s optical signal of the wavelength $\lambda n$.

The 40 Gb/s receiving unit 45-1 performs a receiving process on the 40 Gb/s optical signal of the wavelength $\lambda 1$ which has been subjected to the dispersion compensation by the old variable dispersion compensator 41-1. The 40 Gb/s receiving unit 45-n performs a receiving process on the 40 Gb/s optical signal of the wavelength $\lambda n$ which has been subjected to the dispersion compensation by the old variable dispersion compensator 41-2.

In the case where a part of the 10 Gb/s channels is to be newly replaced by 40 Gb/s channel(s), the new variable dispersion compensator 42 is a newly installed variable dispersion compensator that is installed in a receiving end of the channel to be changed so as to provide the variable dispersion compensation to a newly received 40 Gb/s channel.

Here, since the third channel is set as the new 40 Gb/s channel, the new variable dispersion compensator 42 is installed in the third channel output stage of the wavelength separating unit 26 and provides the dispersion compensation to the residual dispersion of the new 40 Gb/s optical signal based on a control signal output from the variable dispersion compensation controlling unit 44.

The wavelength-to-dispersion compensation amount characteristic generating unit 43 obtains an old dispersion compensation amount, which is a dispersion compensation amount of a 40 Gb/s optical signal channel corresponding to the wavelength $\lambda 1$ and is already set in the old variable dispersion compensator 41-1. The wavelength-to-dispersion compensation amount characteristic generating unit 43 also obtains an old dispersion compensation amount, which is a dispersion compensation amount of a 40 Gb/s optical signal channel corresponding to the wavelength $\lambda n$ and is already set in the old variable dispersion compensator 41-2, and generates a wavelength-to-dispersion compensation amount characteristic.

The variable dispersion compensation controlling unit 44 obtains a new dispersion compensation amount, which is the dispersion compensation amount corresponding to the wavelength of the newly introduced 40 Gb/s optical signal, by estimation from the wavelength-to-dispersion compensation amount characteristic, and transmits the obtained new dispersion compensation amount to the new variable dispersion compensator 42 by a control signal.

The new variable dispersion compensator 42, in which the new dispersion compensation amount that is transmitted from the variable dispersion compensation controlling unit 44 is set, provides the dispersion compensation to suppress the residual dispersion amount of the newly installed 40 Gb/s optical signal to within the dispersion tolerance.

Figure 8:
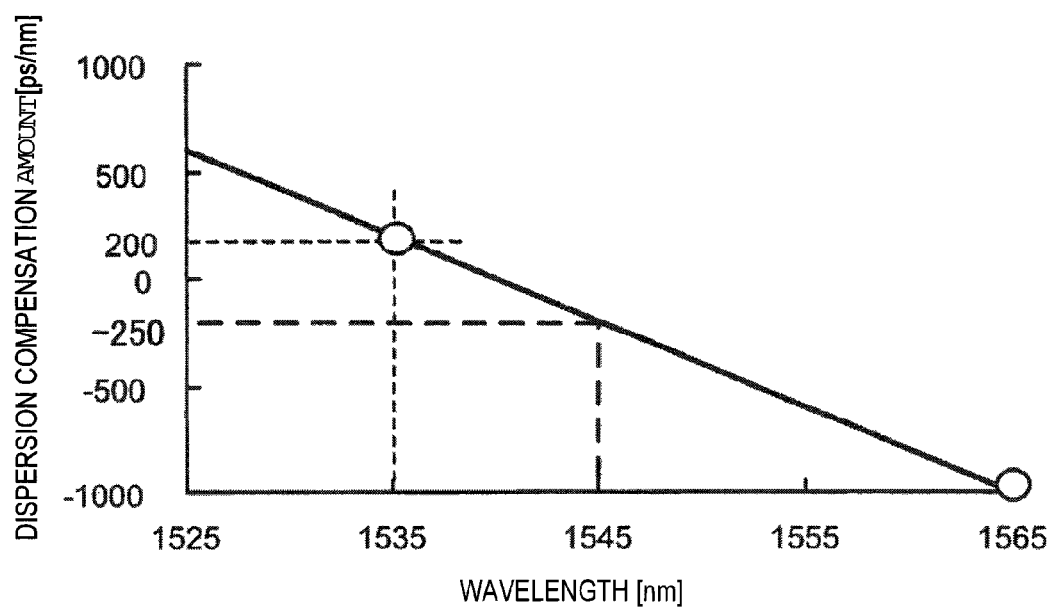
FIG. 8 illustrates a wavelength-to-dispersion compensation characteristic.

Now the wavelength-to-dispersion compensation amount characteristic will be described. FIG. 8 illustrates the wavelength-to-dispersion compensation characteristic. The vertical axis indicates dispersion compensation amounts (ps/nm) and the horizontal axis indicates wavelengths (nm). The wavelength-to-dispersion compensation amount characteristic generating unit 43 obtains an old dispersion compensation amount from two or more old variable dispersion compensators and generates the wavelength-to-dispersion compensation amount characteristic.

If $\lambda 1=1535$ nm and $\lambda n=1565$ nm, the wavelength-to-dispersion compensation amount characteristic generating unit 43 obtains the dispersion compensation amount=200 ps/nm corresponding to the 40 Gb/s wavelength $\lambda 1=1535$ nm, which is already set in the old variable dispersion compensator 41-1. The wavelength-to-dispersion compensation amount characteristic generating unit 43 also obtains the dispersion compensation amount=−1000 ps/nm corresponding to the 40 Gb/s wavelength $\lambda n=1565$ nm, which is already set in the old variable dispersion compensator 41-2. Then, it plots (wavelength, dispersion compensation amount)=(1535, 200), (1565, −1000), connects the plotted points with a straight line and generates a graph illustrating the wavelength-to-dispersion compensation amount characteristic.

Assuming that the wavelength $\lambda 3$ for which 40 Gb/s is to be newly installed is 1545 nm, the variable dispersion compensation controlling unit 44 obtains the dispersion compensation amount=−250 ps/nm corresponding to 1545 nm from the generated wavelength-to-dispersion compensation amount characteristic and transmits the obtained −250 ps/nm to the new variable dispersion compensator 42 by a control signal.

The new variable dispersion compensator 42, in which the dispersion compensation amount=−250 ps/nm that is transmitted from the variable dispersion compensation controlling unit 44 is set, provides the dispersion compensation to suppress the residual dispersion amount of the newly installed 40 Gb/s optical signal to within the dispersion tolerance (this proves that the residual dispersion of the 40 Gb/s optical signal of $\lambda 3$ is +250 ps/nm).

As described above, in the case where a WDM transmission has been operated by both low speed channels and high speed channels and one or more of the low speed channels are replaced by the high speed channels, the wavelength and the dispersion compensation amount are obtained from the already installed plurality of old variable dispersion compensators and the wavelength-to-dispersion compensation amount characteristic is generated. Then, the dispersion compensation amount required for conveying the newly installed 40 Gb/s optical signal is estimated from the generated wavelength-to-dispersion compensation amount characteristic and is automatically set in the new variable dispersion compensator.

That saves the operator from the conventional operation of coarse adjustment which takes much time. The operator only needs to perform the fine adjustment for obtaining a dispersion amount that optimizes a transmission quality such as the Q penalty. That enables speedy installation of a high speed channel, contributing to improvement of the operability and convenience.

When the wavelength-to-dispersion compensation amount characteristic is generated, two or more high speed channels are already in operation. In such a case, the second embodiment is not applied to a system in which only one channel is operated by a high speed channel, even if the system is for the WDM transmission which operates with both low speed channel(s) and high speed channel(s). In such a case, the first embodiment for setting the dispersion compensation amount by estimating the residual dispersion from the low speed channels is applied.

Figure 9:
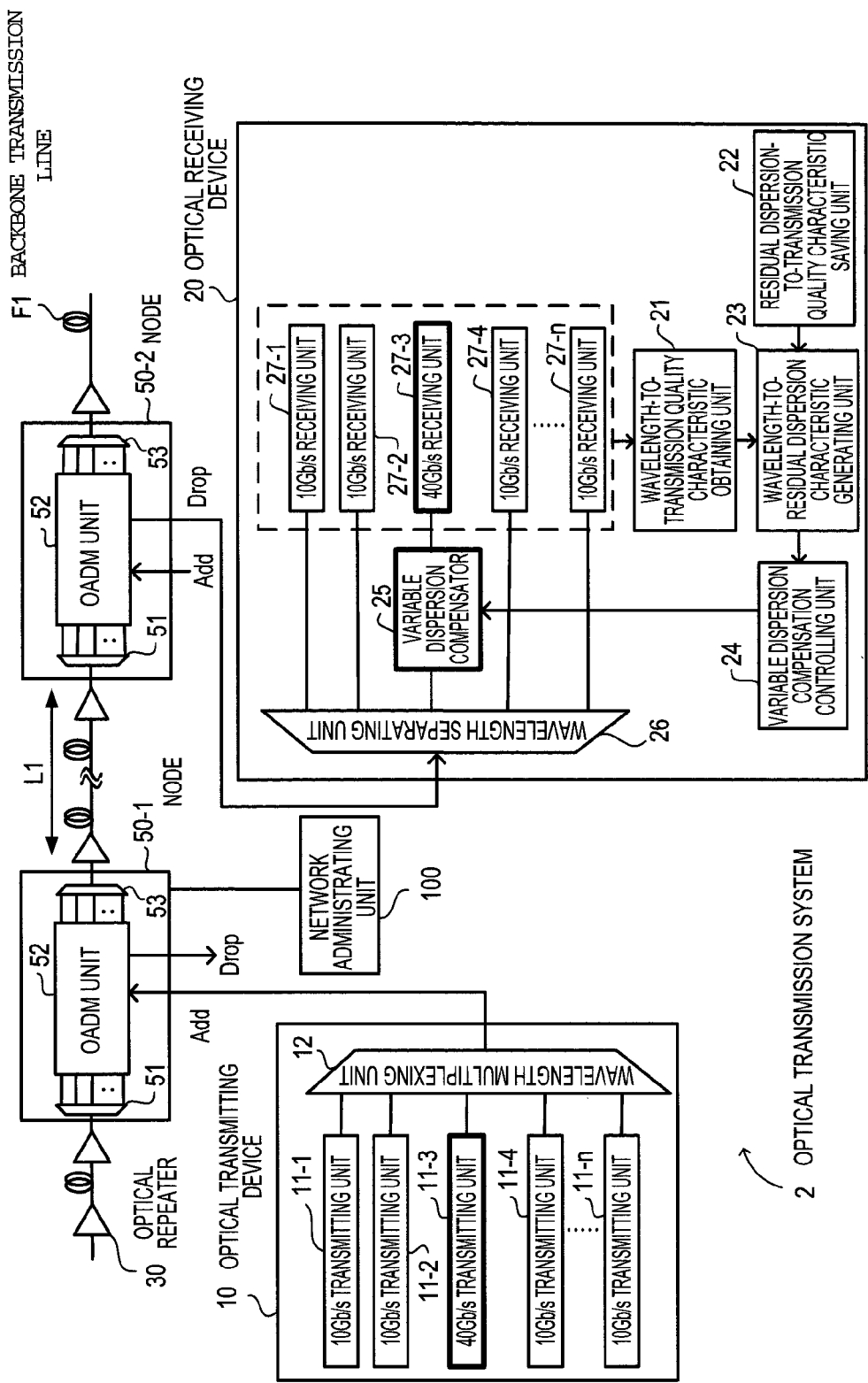
FIG. 9 illustrates a configuration of an optical transmission system.

Now a case where the first embodiment is applied to an optical transmission system with an OADM (Optical Add and Drop Multiplexing) function will be described. FIG. 9 illustrates a configuration of the optical transmission system.

An optical transmission system 2 is composed of nodes (optical transmission nodes) 50-1 and 50-2, a network administrating unit 100, an optical transmitting device 10, an optical receiving device 20, and optical repeaters 30. The nodes 50-1 and 50-2 and the plurality of optical repeaters 30 are installed on a backbone transmission line F1. The optical transmitting device 10 is connected to the Add port side of a tributary of the node 50-1, whereas the optical receiving device 20 is connected to the Drop port side of a tributary of the node 50-2.

The optical transmitting device 10 adds (inserts) a WDM signal that is generated by multiplexing the wavelength of respective channels to the node 50-1. The optical receiving device 20 receives the WDM signal that is dropped (branched out) at the node 50-2, and provides the dispersion compensation to respective channels that compose the WDM signal. As the detailed configurations of the optical transmitting device 10 and the optical receiving device 20 have been described above, an explanation is omitted.

Each of the nodes 50-1 and 50-2 is composed of a wavelength separating unit 51, an OADM unit (Optical Add Drop Multiplexer) 52, and a wavelength multiplexing unit 53. The wavelength separating unit 51 receives a WDM signal flowing through the trunk transmission line F1 and separates the WDM signal for each wavelength.

The OADM unit 52 adds an optical signal that is transmitted from the Add port of the tributary (adds an optical signal whose wavelength is different from that of the WDM signal flowing through the backbone transmission line F1), and drops an optical signal that is separated from the WDM signal to the Drop port of the tributary.

In FIG. 9, the OADM unit 52 of the node 50-1 adds the optical signal of the wavelength $\lambda 3$ at the third channel that is transmitted from the optical transmitting device 10. The OADM unit 52 of the node 50-2 drops the optical signal of the wavelength $\lambda 3$ at the third channel to the optical receiving device 20. The wavelength multiplexing unit 53 generates a WDM signal by multiplexing optical signals with different wavelengths after the OADM process, and sends the WDM signal to the backbone transmission line F1.

The network administrating unit 100 connects with at least one node on the backbone transmission line F1 and administrates the operations of the nodes 50-1 and 50-2, the optical transmitting device 10, and the optical receiving device 20 (operation monitoring, parameter setting control, and the like) (in the figure, the network administrating unit 100 connects with the node 50-1).

Now, the dispersion compensation control in the case where the 10 Gb/s third channel is changed to 40 Gb/s will be described. In such a system with the OADM function, since the nodes that add and drop a transmitted optical signal differ for each channel, the transmission quality also differs for each channel.

To measure the transmission quality of the 10 Gb/s optical signals, a way of measuring the transmission quality by using channels for the 10 Gb/s optical signals which flow in the same transmission line section as the newly installed 40 Gb/s optical signal flows through can improve the accuracy.

The network administrating unit 100 distinguishes the node from which the newly installed 40 Gb/s optical signal is added and the node to which the 40 Gb/s optical signal is dropped (distinguishes the node from which the 40 Gb/s optical signal is added and the node to which the 40 Gb/s optical signal is dropped), and distinguishes the transmission line section on the backbone transmission line F1 through which the 40 Gb/s optical signal flows.

In this example, the 40 Gb/s optical signal of the wavelength $\lambda 3$ is added from the node 50-1 and dropped from the node 50-2, which means the newly installed 40 Gb/s optical signal flows through the transmission line section L1.

When the network administrating unit 100 distinguishes that the section through which the newly installed 40 Gb/s optical signal flows is the transmission line section L1, it further identifies the channels (the wavelengths) of the 10 Gb/s optical signals which flow through the transmission line section L1 and notifies the identified results to the optical receiving device 20. The wavelength-to-transmission quality characteristic obtaining unit 21 measures the transmission qualities by using the notified channels of the 10 Gb/s optical signals and generates the wavelength-to-transmission quality characteristic.

If the 10 Gb/s optical signals which flow through the transmission line section L1 are channels of $\lambda 1$, $\lambda 2$, and $\lambda 4$ to $\lambda n$, the wavelength-to-transmission quality characteristic obtaining unit 21 measures the transmission qualities from the channels of the wavelengths, respectively.

The operations hereafter are the same as those in the first embodiment. The wavelength-to-residual dispersion characteristic generating unit 23 generates the wavelength-to-residual dispersion characteristic based on the wavelength-to-transmission quality characteristic and the residual dispersion-to-transmission quality characteristic which are generated from the transmission quality of the 10 Gb/s optical signals which flow through the transmission line section L1.

Then, the variable dispersion compensation controlling unit 24 obtains the residual dispersion amount at $\lambda 3$ from the wavelength-to-residual dispersion characteristic, and transmits the residual dispersion amount of its opposite sign to the variable dispersion compensator 25. The variable dispersion compensator 25, in which the transmitted amount is set, provides the dispersion compensation to the 40 Gb/s optical signal of the wavelength $\lambda 3$.

Figure 10:
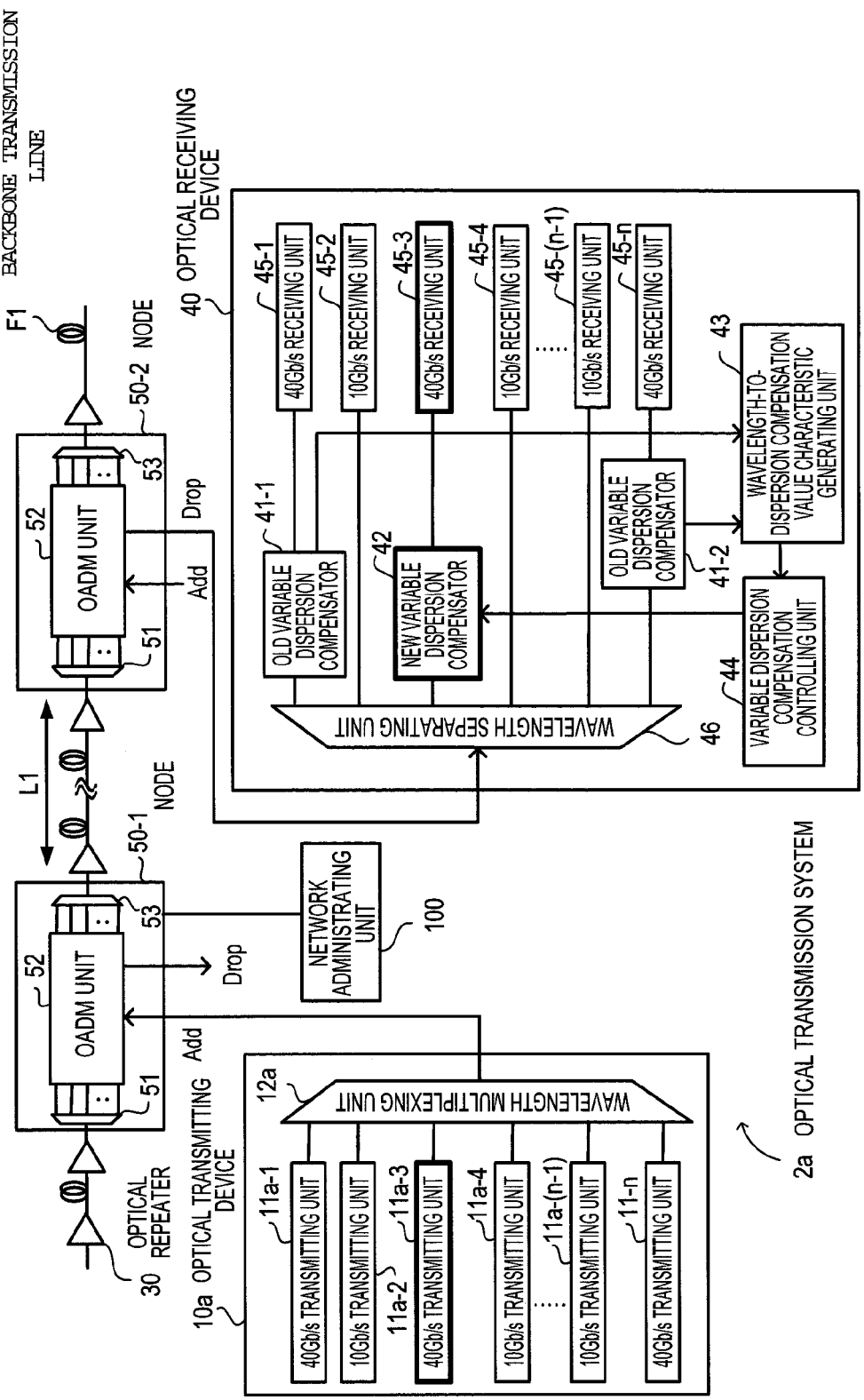
FIG. 10 illustrates a configuration of an optical transmission system.
Figure 11:
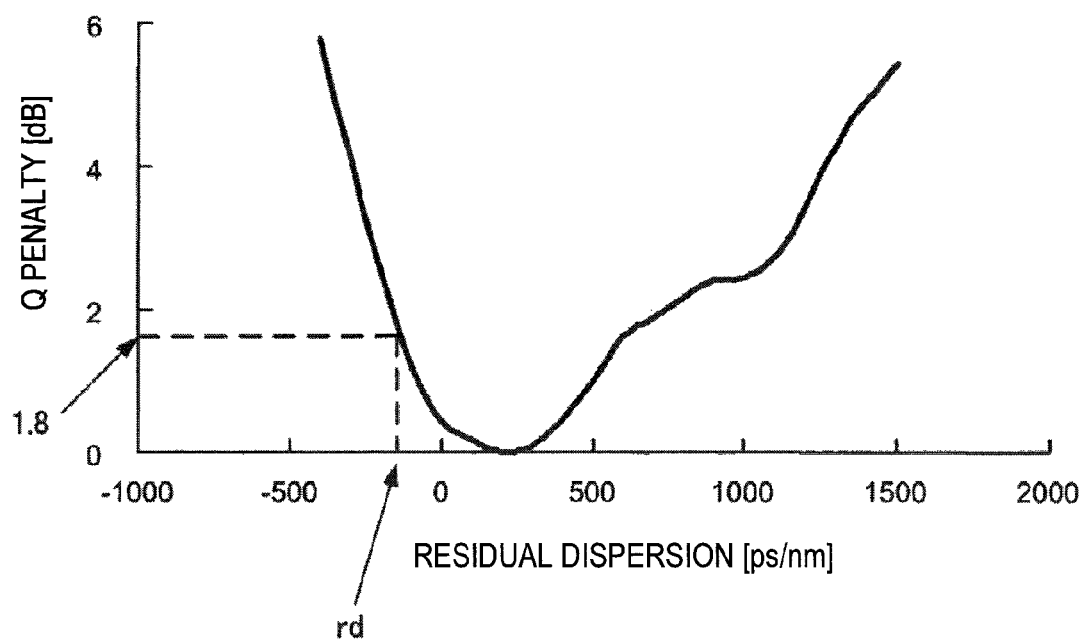
FIG. 11 illustrates a dispersion tolerance characteristic.

Now a case where the second embodiment is applied to an optical transmission system with an OADM function will be described. FIG. 10 illustrates a configuration of an optical transmission system. An optical transmission system 2a is composed of nodes 50-1 and 50-2, a network administrating unit 100, an optical transmitting device 10a, an optical receiving device 40, and optical repeaters 30.

The nodes 50-1 and 50-2 and the plurality of optical repeaters 30 are installed on a backbone transmission line F1. The optical transmitting device 10a is connected to the Add port side of the node 50-1, whereas the optical receiving device 40 is connected to the Drop port side of the node 50-2.

The optical transmitting device 10a adds a WDM signal that is generated by multiplexing the wavelength of respective channels to the node 50-1. The optical receiving device 40 receives the WDM signal that is dropped at the node 50-2, and provides the dispersion compensation to the respective channels that compose the WDM signal. As the configurations of the nodes 50-1 and 50-2, the optical transmitting device 10a and the optical receiving device 40 have been described above, an explanation is omitted.

The network administrating unit 100 connects with at least one node on the backbone transmission line F1 and administrates the operations of the nodes 50-1 and 50-2, the optical transmitting device 10a, and the optical receiving device 40 (operation monitoring, parameter setting control, and the like) (in the figure, the network administrating unit 100 connects with the node 50-1).

Now the dispersion compensation control made in the case where 10 Gb/s at the third channel is changed to 40 Gb/s will be described. In the case of the optical transmission system 2a, the dispersion compensation amount to be set in a new variable dispersion compensator 42 is obtained by using information on channels which flow through the same transmission line section as the newly installed 40 Gb/s channel flows through in the same manner as that described in FIG. 9.

Here, the network administrating unit 100 identifies the node from which the newly installed 40 Gb/s optical signal is inserted and the node to which the 40 Gb/s optical signal is branched out, and identifies the transmission line section on the backbone transmission line F1 through which the 40 Gb/s optical signal flows.

In this example, the 40 Gb/s optical signal of the wavelength λ3 is added from the node 50-1 and dropped from the node 50-2, which means the newly installed 40 Gb/s optical signal flows through the transmission line section L1.

When the network administrating unit 100 identifies that the section through which the newly installed 40 Gb/s optical signal flows is the transmission line section L1, it further identifies the channels (the wavelengths) of the already installed 40 Gb/s optical signals which flow through the transmission line section L1 and notifies the identified results to the optical receiving device 40. A wavelength-to-dispersion compensation amount characteristic generating unit 43 obtains old dispersion compensation amounts from the old variable dispersion compensators 41-1 and 41-2 that provide the dispersion compensation to the notified channels of the 40 Gb/s optical signal, and generates the wavelength-to-dispersion compensation amount characteristic.

If the 40 Gb/s optical signals of the wavelengths λ1 and λn flow through the transmission line section L1 as the already introduced 40 Gb/s optical signals, the wavelength-to-dispersion compensation amount characteristic generating unit 43 obtains the old dispersion compensation amounts from the old dispersion compensators 41-1 and 41-2 that provide the dispersion compensation to the wavelengths λ1 and λn, and generates the wavelength-to-dispersion compensation amount characteristic.

The operations hereafter are the same as those in the second embodiment. The variable dispersion compensation controlling unit 44 obtains a new dispersion compensation amount corresponding to the wavelength λ3 of the 40 Gb/s optical signal from the wavelength-to-dispersion compensation controlling unit 44, and transmits the new dispersion compensation amount to the new variable dispersion compensator 42. The new variable dispersion compensator 42, in which the new dispersion compensation amount that is transmitted from the variable dispersion compensation controlling unit 44 is set, provides the dispersion compensation to the 40 Gb/s optical signal of the wavelength λ3.

As described above, with the dispersion compensation amount for compensating an expected residual dispersion amount for a high speed channel previously set in the variable dispersion compensator, the residual dispersion amount of a signal to be input to the optical receiver is suppressed to within the dispersion tolerance, which eliminates the coarse adjustment of searching for a dispersion amount to convey the signal. That enables speedy introduction of a high speed signal.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An optical receiving device, comprising:
   a wavelength-to-transmission quality characteristic obtaining unit for obtaining a wavelength-to-transmission quality characteristic that represents a relationship between wavelengths of other channels and transmission qualities;
   a residual dispersion-to-transmission quality characteristic saving unit for saving a residual dispersion-to-transmission quality characteristic that represents a relationship between residual dispersion and transmission qualities;
   a wavelength-to-residual dispersion characteristic generating unit for generating a wavelength-to-residual dispersion characteristic from a relationship between the wavelengths of said other channels and said residual dispersion based on said wavelength-to-transmission quality characteristic and said residual dispersion-to-transmission quality characteristic;
   a variable dispersion compensator for making variable dispersion compensation to another channel, wherein said variable dispersion compensator is installed in a receiving end of another channel to replace when one of said other channels is replaced by said another channel; and
   a variable dispersion compensation controlling unit for performing setting control on a dispersion compensation amount to be set to said variable dispersion compensator; wherein
   when said another channel is installed, said variable dispersion compensation controlling unit obtains a residual dispersion amount corresponding to a wavelength that is changed to said another channel from said wavelength-to-residual dispersion characteristic, and transmits said obtained residual dispersion amount of its opposite sign to said variable dispersion compensator; and
   said variable dispersion compensator sets the amount that is transmitted from said variable dispersion compensation controlling unit and provides the dispersion compensation to suppress said residual dispersion amount of said another channel to within a dispersion tolerance.

2. The optical receiving device according to claim 1, wherein
   said wavelength-to-transmission quality characteristic obtaining unit obtains a wavelength-to-Q penalty characteristic by obtaining a Q penalty for each wavelength of said other channels as a transmission quality of said other channel; and
   said residual dispersion-to-transmission quality characteristic saving unit saves a residual dispersion-to-Q penalty characteristic as a relationship between the residual dispersion and the transmission quality.

3. An optical receiving device for performing a receiving process on a wavelength multiplexed signal that is composed of low speed channels and high speed channels, comprising:
   an already installed old variable dispersion compensator for making variable dispersion compensation to said received old high speed channel, wherein said already installed old variable dispersion compensator is installed in a receiving end of the already introduced old high speed channel;

a newly installed new variable dispersion compensator for providing the variable dispersion compensation to a received new high speed channel, wherein said newly installed new variable dispersion compensator is installed in a receiving end of the channel to be changed when a part of said other channels is changed to said new high speed channel;

a wavelength-to-dispersion compensation amount characteristic generating unit for generating a wavelength-to-dispersion compensation amount characteristic by obtaining an old dispersion compensation amount from two or more of said old variable dispersion compensators, wherein said old dispersion compensation amount is a dispersion compensation amount corresponding to the wavelength of said old high speed channel and is already set in said old variable dispersion compensator; and a variable dispersion compensation controlling unit for performing setting control on a new dispersion compensation amount that is a dispersion compensation amount to be set in said new variable dispersion compensator; wherein when said new high speed channel is introduced, said variable dispersion compensation controlling unit obtains said new dispersion compensation amount corresponding to a wavelength that is changed to said new high speed channel from said wavelength-to-dispersion compensation amount characteristic, and transmits said obtained new dispersion compensation amount to said new variable dispersion compensator; and said new variable dispersion compensator sets said new dispersion compensation amount that is transmitted from said variable dispersion compensation controlling unit and provides dispersion compensation to suppress a residual dispersion amount of said new high speed channel to within a dispersion tolerance.

4. An optical transmission system for transmitting a wavelength multiplexed signal, comprising:

a plurality of optical transmitting nodes including an optical add drop unit for adding an optical signal that is transmitted from a tributary into said wavelength multiplexed signal that flows through a backbone transmission line or dropping an optical signal that is separated from said wavelength multiplexed signal out to said tributary, wherein said plurality of optical transmitting nodes are arranged on said backbone transmission line;

an optical receiving device comprising: a wavelength-to-transmission quality characteristic obtaining unit for obtaining a wavelength-to-transmission quality characteristic that represents a relationship between wavelengths of other channels and transmission qualities that are actually measured for the respective wavelengths of said other channels by measuring said transmission qualities of said other channels which compose a wavelength multiplexed signal which is dropped from said optical transmitting node and then received; a residual dispersion-to-transmission quality characteristic saving unit for saving a residual dispersion-to-transmission quality characteristic that represents a relationship between residual dispersion and transmission qualities; a wavelength-to-residual dispersion characteristic generating unit for generating a wavelength-to-residual dispersion characteristic by estimating a relationship between the wavelengths of said other channels and said residual dispersion based on said wavelength-to-transmission quality characteristic and said residual dispersion-to-transmission quality characteristic without measuring said residual dispersion of said other channels; a variable dispersion compensator for providing variable dispersion compensation to another channel, wherein said variable dispersion compensator is installed in a receiving end of the another channel to be changed when one of said other channels is changed to said another channel; and a variable dispersion compensation controlling unit for performing setting control on a dispersion compensation amount to be set in said variable dispersion compensator, wherein said optical receiving device is arranged at said tributary and connects with said optical transmitting nodes for receiving a branched optical signal; and a network administrating unit for administrating operations of said optical transmitting nodes and said optical receiving device, wherein said network administrating unit learns a transmission line section between where said another channel is added and where said another channel is dropped on said backbone transmission line through which said another channel flows, and notifies said other channels which flow through said transmission line section to said optical receiving device;

said wavelength-to-transmission quality characteristic obtaining unit obtains said wavelength-to-transmission quality characteristic by measuring the transmission qualities of said other channels that flow through said notified transmission line section;

when said another channel is introduced, said variable dispersion compensation controlling unit obtains a residual dispersion amount corresponding to a wavelength that is changed to said another channel from said wavelength-to-residual dispersion characteristic, and transmits said obtained residual dispersion amount of its opposite sign to said variable dispersion compensator; and, said variable dispersion compensator sets the amount that is transmitted from said variable dispersion compensation controlling unit and provides the dispersion compensation to suppress said residual dispersion amount of said another channel to within a dispersion tolerance.

5. The optical transmission system according to claim 4, wherein said wavelength-to-transmission quality characteristic obtaining unit obtains a wavelength-to-Q penalty characteristic by measuring a Q penalty for each wavelength of said other channels as a transmission quality of said other channel; and said residual dispersion-to-transmission quality characteristic saving unit saves a residual dispersion-to-Q penalty characteristic as a relationship between the residual dispersion and the transmission quality.

6. An optical transmission system for transmitting a wavelength multiplexed signal that is composed of low speed channels and high speed channels, comprising:

a plurality of optical transmitting nodes including an optical add drop unit for adding an optical signal that is transmitted from a tributary into said wavelength multiplexed signal that flows through a backbone transmission line or dropping an optical signal that is separated from said wavelength multiplexed signal out to said tributary, wherein said plurality of optical transmitting nodes are arranged on said backbone transmission line;

an optical receiving device comprising: an already installed old variable dispersion compensator for making variable dispersion compensation to said old high speed channel which is dropped from said optical transmitting node and then received, wherein said already installed old variable dispersion compensator is installed at a receiving end of the already introduced old high speed channel; a newly installed new variable dispersion compensator for making the variable dispersion compensation to a new high speed channel which is dropped from said optical transmitting node and then received, wherein said newly installed new variable dispersion compensator is installed at a receiving end of the channel to be changed when a part of said low speed channels is changed to said new high speed channel; a wavelength-to-dispersion compensation amount characteristic generating unit for generating a wavelength-to-dispersion compensation amount characteristic by obtaining an old dispersion compensation amount from two or more of said old variable dispersion compensators, wherein said old dispersion compensation amount is a dispersion compensation amount corresponding to the wavelength of said old high speed channel and is already set in said old variable dispersion compensator; and a variable dispersion compensation controlling unit for performing setting control on a new dispersion compensation amount that is a dispersion compensation amount to be set in said new variable dispersion compensator, wherein said optical receiving device is arranged at said tributary and connects with said optical transmitting nodes for receiving a branched optical signal; and a network administrating unit for administrating operations of said optical transmitting nodes and said optical receiving device, wherein said network administrating unit learns a transmission line section between where said new high speed channel is added and where said new high speed channel is dropped on said backbone transmission line through which said new high speed channel flows, and notifies said old high speed channels which flow through said transmission line section to said optical receiving device;

said wavelength-to-dispersion compensation amount characteristic generating unit generates said wavelength-to-dispersion compensation amount characteristic by obtaining said old dispersion compensation amounts from said old variable dispersion compensators which provide the dispersion compensation to said old high speed channels which flow through said notified transmission line section, when said new high speed channel is introduced, said variable dispersion compensation controlling unit obtains said new dispersion compensation amount corresponding to a wavelength that is changed to said new high speed channel from said wavelength-to-dispersion compensation amount characteristic, and transmits said obtained new dispersion compensation amount to said new variable dispersion compensator; and said new variable dispersion compensator sets said new dispersion compensation amount that is transmitted from said variable dispersion compensation controlling unit and provides dispersion compensation to suppress a residual dispersion amount of said new high speed channel to within a dispersion tolerance.

7. An optical receiving device, comprising:
a first quality characteristic saving unit for saving a first transmission quality characteristic that represents a transmission quality for each channel of channels which compose a received wavelength multiplexed signal;
a second quality characteristic saving unit for saving a second transmission quality that represents a relationship between residual dispersion and a transmission quality;
a dispersion characteristic generating unit for generating a residual dispersion characteristic for each channel based on said first transmission quality characteristic and said second transmission quality characteristic;
a variable dispersion compensator for compensating chromatic dispersion; and
a controlling unit for controlling a compensation amount of the variable dispersion compensator; wherein
said controlling unit obtains a residual dispersion amount corresponding to the wavelength of a new channel and controls said variable dispersion compensator based on the obtained residual dispersion amount when said new channel is introduced.

8. An optical receiving device, comprising:
a wavelength-to-transmission quality characteristic obtaining unit obtaining a wavelength-to-transmission quality characteristic;
a residual dispersion-to-transmission quality characteristic saving unit saving a residual dispersion-to-transmission quality characteristic;
a wavelength-to-residual dispersion characteristic generating unit generating a wavelength-to-residual dispersion characteristic from a relationship between the wavelengths of said other channels and said residual dispersion based on said wavelength-to-transmission quality characteristic and said residual dispersion-to-transmission quality characteristic;
a variable dispersion compensator for providing variable dispersion compensation to another channel, wherein said variable dispersion compensator is installed at a receiving end of the another channel to be changed when said one of other channels is changed to said another channel; and
a variable dispersion compensation controlling unit for performing setting control on a dispersion compensation amount to be set in said variable dispersion compensator.

* * * * *